Patented Oct. 23, 1934

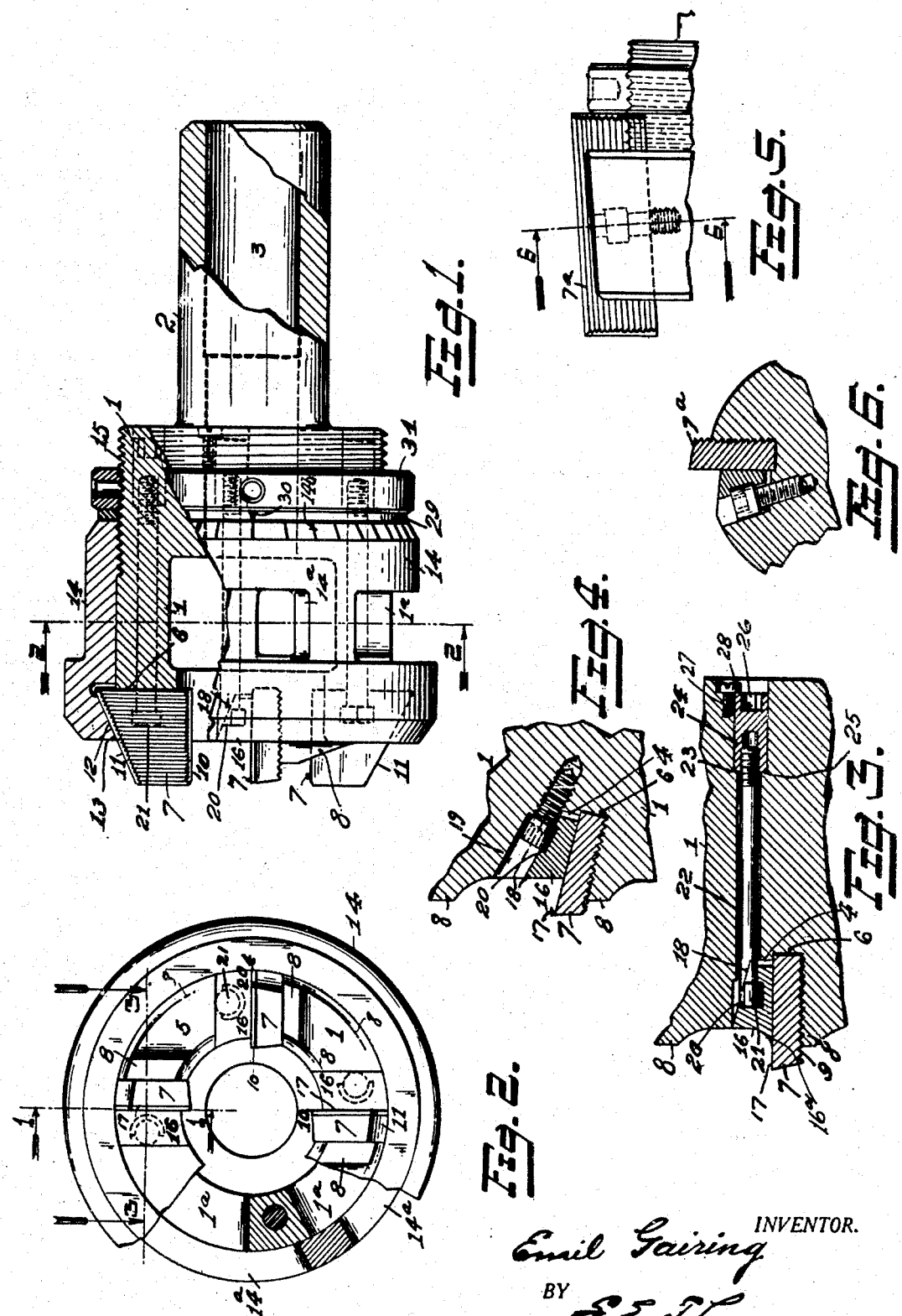

1,978,130

UNITED STATES PATENT OFFICE 1,978,130

HOLLOW MILLING TOOL

Emil Gairing, Detroit, Mich.

Application March 17, 1934, Serial No. 716,053

3 Claims. (Cl. 29—105)

My invention relates to a hollow milling tool in which the cutting blades are removable and radially adjustable in the body of the tool.

The body of the tool is constructed of "mild" steel and relatively inexpensive, compared with the "high-speed" steel, employed in the construction of its radially movable cutting blades, adjustably inserted in the body of the tool.

Tools of this character are designed to produce a finished surface,—the perfection of which is largely dependent upon their structural qualities,—and especially upon the rigidity and accuracy with which the cutting blades may be secured in fixed position in the supporting body of the tool.

The primary object of the present invention is to provide for a radial adjustment of the cutting blades to adapt the tool for machining work which may vary in size, diameter and form.

Another feature of the invention consists in a rotatable sleeve, encircling the cutting blades and the body of the tool,—the latter having a calibrated face for determining the necessary adjustment of the cutting blades to adapt the tool for the requirements of the work.

Another feature of the invention consists in means for locking the cutting blades in radial grooves milled in the body of the tool;—said means comprising a plurality of wedges, respectively lodged in the grooves, with one face of each wedge bearing upon the smooth face of a cutting blade,—its opposite face being in contact with an inclined smooth surface milled respectively in the tool body adjacent a plurality of upstanding lugs serving as a backing for the cutting blades, and serrated to receive and interlock with the serrations on one face of the respective cutting blades to insure the latter against tilting when radially adjusted. The wedges may be severally shifted to lock the blades by the longitudinal adjustment of bolts having their heads lodged in a recess in the inclined walls of the wedges,—the bolts being longitudinally adjusted by the manual rotations of nuts engaging the screw-threaded ends of said bolts.

An alternative feature of the invention consists in means for supporting the cutting blades on an angle to the axis of the tool.

With the foregoing and other objects in view which will appear as the description proceeds the invention further resides in the combination and arrangement of parts and in the details of construction hereinafter described and claimed, it being understood that changes may be made in the precise embodiment of the invention herein disclosed without departing from the spirit of the same.

In the drawing accompanying this specification:—

Figure 1 is an elevation of the tool with parts in section taken on or about line 1—1 of Figure 2.

Figure 2 is an end view, with parts broken away,—taken on or about line 2—2 of Figure 1, disclosing relatively large openings through the body of the tool, and its encircling collar for chip clearance.

Figure 3 is a sectional view, taken on or about line 3—3 of Figure 2, indicating the method of locking the respective cutting blades in position when adjusted.

Figure 4 is a fragmentary view disclosing an alternative method of locking the blades in place after setting the blades on an angle to the axis of the tool.

Figure 5 is a fragmentary view, indicating the type of inserted blade, employed by the milling tools in general use,—in which rectangular blades slightly inclined are made adjustable in slots approximately parallel with the axis of the tool;—in this type of tool the blades, constructed of "high-speed" steel, are necessarily of greater area and therefore more costly than the small blades of like material employed in the present invention.

Figure 6 shows a cross-sectional view, taken on or about line 6—6 of Figure 5.

Referring now to the reference numerals on the drawing indicating the several parts of the device:—

The numeral 1, indicates the annular screw-threaded body of the tool which has an integral shank 2, formed with a bore 3, extending through the shank to adapt it for certain classes of work.

The body-portion of the tool at its outer end is provided with a plurality of radial grooves 4, milled in its annular wall 5;—and at the bottom and on one side of each groove 4, is milled a radial groove 6,—see Figures 1, 3 and 4,—in which are respectively seated cutting blades 7, constructed of "high-speed" steel and preferably of a trapezoidal formation, with the relatively shorter side of their parallel edges extending outwardly and beyond the forward end of the tool,—where they are respectively backed by spaced serrated lugs 8,—integral with the tool body and which interlock with the serrations 9, in the abutting faces of the cutting blades 7, thus providing against tilting of the blades, when radially adjusted.

The front and back faces of the cutting blades are parallel—viewed in cross-section,—the inner, or cutting edge of the blade,—see Figure 1—being substantially parallel with the axis of the tool. The outer edge (11) of the blade is inclined, that it may be acted on by the inclined edge (12) of an overlapping flange 13, of the adjustable collar 14, tapped to engage the screw-threaded portion 15, of the body, whereby upon adjusting the collar 14, on the body-portion, the blades may be moved radially to adapt the blades to the proper size or cutting diameter for the work.

Lodged in the radial grooves 4, at the outer end of the body of the tool are a plurality of wedges 16, respectively in contact with the front or leading faces (17) of the cutting blades 7, and also in contact with the opposing faces (18) of the forwardly inclined wall (19), forming one side of the radial grooves.

The inclined faces of the wedges are each provided with a recess 20 to receive the heads of an adjusting bolt 21, extending through bores 22,—in the body of the tool,—which are counterbored at 23, to house adjusting nuts 24, seated against shoulders 25,—formed by the counterbore, and which upon rotation cause the wedges to be shifted to secure or release the cutting blades 7, as will be readily understood. The outer end of the adjusting nuts 24, are formed with a socket 26, to receive a suitable operating wrench—not shown. Screwed into the wall of the body adjacent to the adjusting nut 24, is a locking screw 27, the head 28, of which overlaps the end of the adjusting nut 24,—to secure the latter against accidental release.

The wedges 16 are preferably curved at 16$^a$,—see Figure 3,—to prevent lodgment of chips at this point,—which is apt to occur if the outer face of the wedge and the cutting blade form a sharp corner.

Sleeved upon the body of the tool adjacent to the adjustable collar 14, is a washer 29, provided with an index or pointer 30, to co-ordinate with the calibrated edge 14$^b$, of the collar, whereby the degree of rotation to be given the collar to secure a proper radial adjustment of the cutting blades may be readily determined.

It will be understood that the washer 29, with its index 30, is secured against accidental rotary movement upon the body of the tool by suitable means,—not shown—for example a tongue integral with the washer, extending into a longitudinal groove in the screw-threaded portion of the tool body. An adjustable nut 31, screwed upon the body of the tool adjacent to the washer, serves to hold the washer in proper relation to the calibrated edge 14$^b$ of the sleeve.

Attention is called to the relatively large radial openings 1$^a$, for "chip clearance" in the body of the tool, and the radial openings 14$^a$, in the adjustable collar screwed upon the body of the tool,—through which the chips produced in machining are discharged as rapidly as they are developed.

Attention is particularly called to the advantage gained by a radial adjustment of the cutting blades, as disclosed in Figure 1, over blades 7$^a$, set at a slight angle, adjustable in horizontal slots,—as indicated in Figures 5 and 6. The radial adjustment of the blades 7, provides a construction in which far less "high-speed" steel is necessary to make the blade,—while a further advantage lies in the fact of a far greater percentage of usage is possible in the instant type of tool over the usual substantially horizontal method or construction, shown in Figures 5 and 6 of the drawing.

Another very material advantage gained by the present invention, resides in the relatively large "openings" obtained in the present tool "body" and its "adjustable sleeve";—through which chips are discharged which would otherwise accumulate in a hollow milling tool,—as well as the advantage gained in providing for the ready admission of a suitable lubricant, whenever necessary.

Having described my invention, what I claim is:—

1. A rotary milling tool comprising an annular body having a plurality of radial grooves at its forward end serrated respectively on one wall of each groove; a plurality of radially adjustable cutting blades, serrated on one face of each blade, to interlock with the serrations in the walls of the grooves; wedges lodged in the grooves, adapted to bear upon the front or leading face of the cutting blades and against an opposing inclined wall of the grooves in the annular body, whereby the serrated face of the blades are forced into interlocking relation with the serrated wall of the grooves; bolts extending through bores in the annular body, counterbored to provide a shoulder, substantially parallel with the axis of the tool; the head of said bolts being respectively lodged in a recess extending inwardly from the inclined face of the wedge; adjustable nuts, screwed on the opposite threaded end of said bolts and bearing against the shoulder formed by the counterbore; and means for locking the adjustable nuts against accidental rotation.

2. A rotary milling tool comprising an annular body having a plurality of radial grooves at its forward end; upstanding lugs aligned with one of the walls of each groove and integral with the annular body, the face of the wall and adjacent lug of each groove being serrated; a plurality of cutting blades, serrated on one face, lodged in the grooves; wedges lodged in the several grooves adapted to bear upon the front or leading face of the cutting blades and against an opposing wall of the grooves of the body; bolts extending through bores in the annular body, counterbored to provide a shoulder, said bores being substantially parallel with the axis of the tool, the heads of said bolts being respectively lodged in recesses extending inwardly from the inclined face of the wedges; adjustable nuts screwed on the opposite threaded end of the bolts and bearing against the shoulder formed by the counterbore; and means for locking the adjustable nuts against accidental rotation.

3. In a rotary milling tool, an annular body having a plurality of radial grooves at its forward end serrated respectively on one wall of each groove; a plurality of radially adjustable cutting blades, serrated on one face of each blade to interlock with the serrations in the walls of the grooves; wedges lodged in the grooves, adapted to bear upon the front or leading face of the cutting blades and against an opposing inclined wall of the grooves in the annular body, whereby the serrated face of the blades are forced into interlocking relation with the serrated wall of the grooves; bolts extending through bores in the annular body, counterbored to provide a shoulder, substantially parallel with the axis of the tool; the head of the bolts being respectively lodged in a recess extending inwardly from the inclined face of the wedge; adjustable nuts, screwed on the opposite threaded end of said bolts and bearing against the shoulder formed by the counterbore; means for radially adjusting the cutting blades; and means for securing the nuts when adjusted.

EMIL GAIRING.